United States Patent
Fujii et al.

(10) Patent No.: US 6,832,298 B2
(45) Date of Patent: Dec. 14, 2004

(54) SERVER SYSTEM OPERATION CONTROL METHOD

(75) Inventors: Hiroaki Fujii, Tokorozawa (JP); Yoshio Miki, Kodaira (JP); Tatsuya Kawashimo, Kokubunji (JP); Akihiro Takamura, Koganei (JP)

(73) Assignee: Hitachi, Ltd., Tokyo (JP)

( * ) Notice: Subject to any disclaimer, the term of this patent is extended or adjusted under 35 U.S.C. 154(b) by 126 days.

(21) Appl. No.: 10/229,053

(22) Filed: Aug. 28, 2002

(65) Prior Publication Data

US 2003/0079093 A1 Apr. 24, 2003

(30) Foreign Application Priority Data

Oct. 24, 2001 (JP) ...................................... P2001-325904

(51) Int. Cl.[7] .............................................. G06F 12/00
(52) U.S. Cl. .......................... 711/147; 711/169; 714/11
(58) Field of Search ................................ 711/147, 173, 711/168–169, 114, 161–162; 714/1–6, 11; 707/202–204

(56) References Cited

U.S. PATENT DOCUMENTS 5,812,757 A * 9/1998 Okamoto et al. ............. 714/11

6,496,940 B1 * 12/2002 Horst et al. ..................... 714/4

OTHER PUBLICATIONS

"Sun Enterprise Cluster Failover", Sun Microsystems (1998), Cover, index and pp. 9–12.

* cited by examiner

*Primary Examiner*—Nasser Moazzami
(74) *Attorney, Agent, or Firm*—Reed Smith L.L.P.; Stanley P. Fisher, Esq.; Juan Carlos A. Marquez, Esq.

(57) ABSTRACT

A main logical unit and a standby logical unit are defined by a process controller in a shared main memory multiprocessor, and an information storage space accessible from both logical units is provided. The main logical unit stores address information onto that information storage space by indicating a memory area it controls as the main memory area. When failover or cloning becomes necessary, the standby logical unit searches the information on the applicable address. Then from the applicable information, it also searches information on the main memory area controlled by the main logical unit to establish in itself and forms a processing environment and state identical to the main logical unit such that the standby logical unit takes over all or a portion of the processing of the main logical unit. This enables the construction of a server system of high operability to overcome failures and poor response times by failover and cloning, etc.

11 Claims, 7 Drawing Sheets

SERVER SYSTEM OPERATION CONTROL METHOD

FIELD OF THE INVENTION

The present invention relates to an operation control method for computer systems of the server class, and relates in particular to a server system operation control method to implement high-speed processing typified by failover processing during system problems and cloning processing during high loads to enhance operability and reliability within the same system.

BACKGROUND OF THE INVENTION

Businesses operating on the Internet may lose business opportunities directly due to being unable to access the system when down or poor response time caused by sudden increase in a server system access. Methods typified by failover and cloning that improve operability have already been proposed as techniques to shorten these time losses as much as possible.

The referred term "failover" is a method to switch from the present main system to a standby system and have the standby system take over the processing, when a problem has occurred in the present system processing. The referred term "cloning" is a method used when the processing of the main system is subjected to heavy loads such that when processing has backed up (delayed) in the main system, a standby system shares a portion of the processing load.

Specific examples of these methods are described in "Sun (™) Enterprise (™) Cluster Failover" white paper issued by Sun Microsystems Inc.

Figure 2:
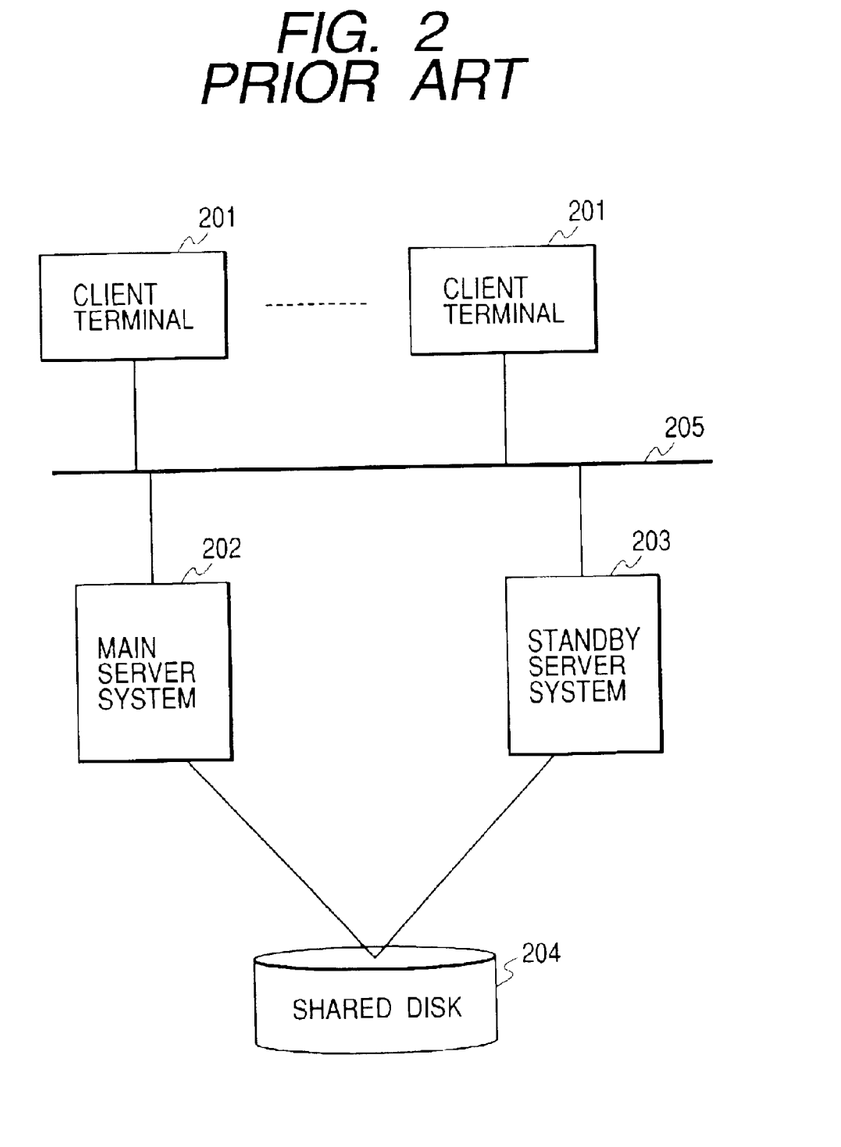
FIG. 2 is a block diagram showing the structure of the cluster system of the related art.

The structure of the server system based on the technology of the related art is shown in FIG. 2.

In this figure, the reference numeral 202 denotes the main server system in charge of the normal processing in this system. Reference numeral 203 denotes the standby server system to take over the processing when an error has occurred in the main server 202.

Reference numeral 204 is a shared disk which is shared by the main server 202 and the standby server system 203. Reference numeral 205 is a network, such as a LAN or the Internet.

Numeral 201 is a client terminal for accessing the server system by way of the same network 205 and requesting processing.

As shown in this drawing, functions such as failover and cloning are implemented in the related art assuming the sharing of information between the main server 202 and the standby server system 203 by the shared disk 204 in a cluster type system.

Figure 3:
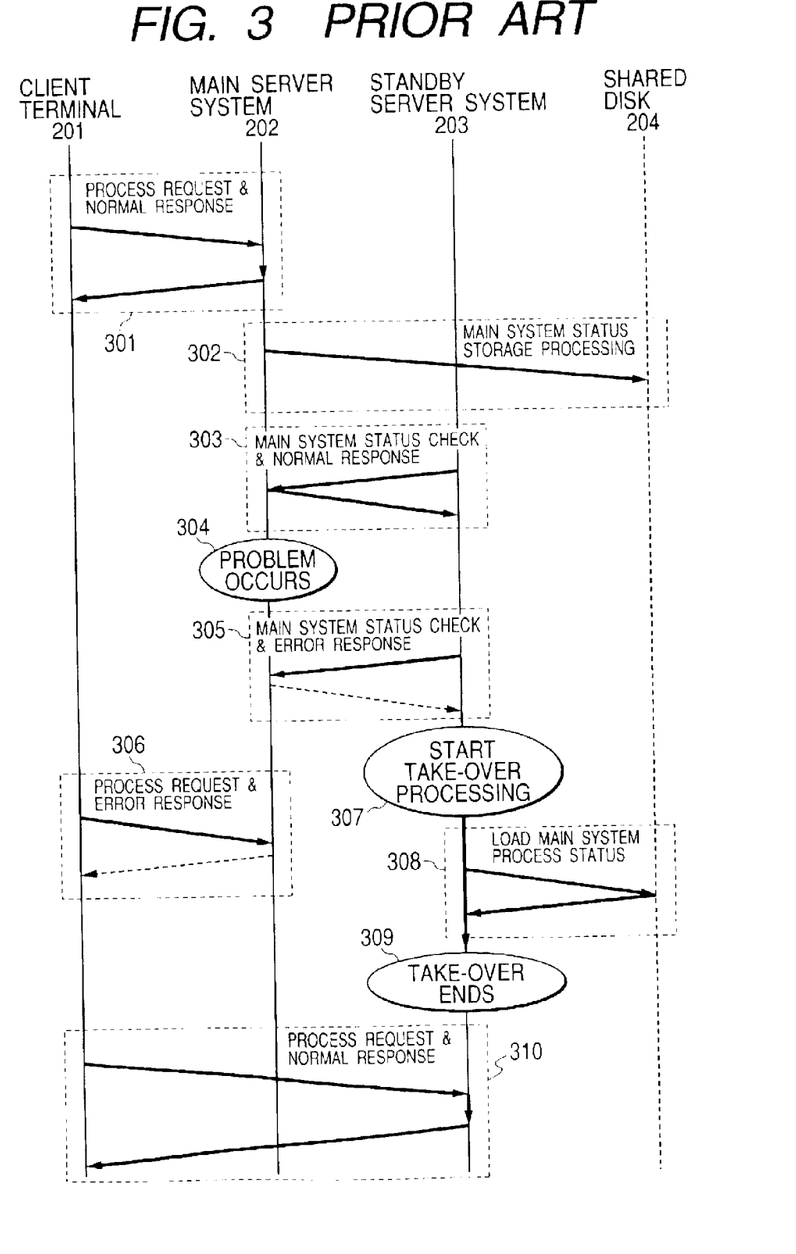
FIG. 3 shows the take-over processing chart when a problem occurs in the cluster system of the related art.

The take-over processing in the server system shown in FIG. 2 is now described while referring to FIG. 3.

In FIG. 3, the time-wise process flow from top to bottom in the mutual interaction among the client terminal 201, the main server system 202, the standby server system 203 and the shared disk 204 that make up the main elements in this processing is shown.

First of all, just as shown in the processing request and normal response 301, during the normal operation, the main server system 202 performs processing according to the processing request from the client terminal 201 and the results are sent back to the client terminal 201 as the response.

This processing is repeated as processing requests are generated from the client terminal 201.

The present server save processing 302 is also conducted during normal operation.

If the main server system 202 is unable to respond to any inquiries due to problems with the hardware or the OS (operating system) or software such that the status information in its main memory cannot be searched, the main server system 202 writes its own required status information on the shared disk 204 at a specified timing.

This process could be constantly performed every time an event caused by a change in status occurs. However, the overhead required for accessing the disk is generally high and there are problems with the main server system 202 processing capability such that this solution is not practical.

The main system operation check request (hereafter "main system operation check") as well as the correct response 303 operation, are operation monitoring processes of the main server system 202 run by the standby server system 203. These processes also run during the normal operation.

The communication to check operating status of the main server system 202 is performed at each timing specified by the standby server system 203. The main server system 202 responds to this communication with a reply that there are no errors and a check is made to ensure that the main server system 202 is operating correctly.

In the figure, 304 indicates a point where a problem has occurred in this main server system 202.

Operation 305 is an operation status check of the main server system 202 made by the standby server system 203 after a problem first occurs, which indicates the standby server system 203 has detected the occurred error.

The error response shows a case that there is absolutely no response or the response is delayed due to an error.

In operation 306 on the other hand, after a problem occurs, the standby server system 203 performs a take-over processing, and the operation from the processing request issued from the client terminal 201 until the main server system 202 processing is taken over by the standby server system 203 is shown.

Here, an error response indicates that a response is not returned within a specified time.

The standby server system 203, having detected a problem in the main server system 202 in the operation 305, commences the take-over processing as shown in operation 307. In that process, in order to restore the processing of the main server system 202, the status information stored in operation 302 by the main server system 202 on the shared disk 204, is loaded from the shared disk 204 in operation 308.

The standby server system 203 restores the processing status of the main server system 202 by using this status information. After preparing to take over the processing from the main server system 202, it completes the take-over processing in operation 309.

The standby server system 203 then starts processing as the main server system as shown by the configuration of operation 310. As a result of operation 306, it responds to reprocessing requests from the client terminal 201 and other processing requests.

These methods of the related art have the following problems and are unable to meet user needs for high operability.

(1) Restoring the main server system 202 processing by using the standby server system 203 required time for accessing the shared disk 204 and for performing the processing.

(2) The most recent information present on the main memory of main server system 202 when the system problem occurred, did not appear in the shared disk 204 or is impossible to load such that there are limits on how far back status could be restored.

The present invention therefore has the object of resolving the above described problems and to provide a system of high operability by shortening access failures and response times by failover and cloning, etc.

SUMMARY OF THE INVENTION

A server system operation control method of the present invention using a single shared memory type multiprocessor system made up of plural processors, a main memory device, an external memory device and a single shared main memory multiprocessor and a connection means for mutually connecting these components is characterized in that, at two logical units are defined with each unit made up of any number processors and a portion of a main memory device, one logical unit is defined as a main logical unit and the other is defined as a standby logical unit; a memory segment is provided on the main memory device to be accessible from both the main logical unit and the standby logical unit and, an information storage space is provided on the memory segment to store information for take-over of control from the main logical unit to the standby logical unit; and the main logical unit stores information required for take-over of control to the information storage space as the information is made, and the standby logical unit searches information stored in the information storage space when a take-over request is sent to the standby logical unit from the main logical unit and forms a processing environment and state identical to the main system, and then takes over all or a portion of the processing of the main logical unit.

The present invention is further characterized by a standby logical unit to take over control from the main logical unit, so that at a point in time where the standby logical unit receives a request from the main system to take over control, the standby logical unit searches information stored in the information storage space and, based on the information obtained from the search results, accesses the main memory resources controlled by the main logical unit, forms a processing environment and state identical to the main system by storing the main memory resources on a main memory device controlled by the standby logical unit, and afterwards takes over all or a portion of the processing of the main logical unit.

The main logical unit of the present invention is further characterized in that a plurality of memory areas on a main memory area controlled by the main logical unit contain environment and processing status information on the main logical unit that are required for copying onto a main memory area controlled by the standby logical unit; and when the main logical unit requests the standby logical unit to take over processing, the main memory addresses for the memory areas are stored or rewritten onto the information storage space when acquiring the memory area or changing locations on the memory area; and when taking over the processing from the main logical unit, the standby logical unit searches in sequence, the information address space on the main memory addresses for the plurality of memory areas, and obtains the information on the main memory area controlled by the main logical unit, based on the main memory addresses.

The control method of the present invention is further characterized in that a control processor defines logical structure of a shared main memory multiprocessor system, such that one logical unit is a main logical unit and the other unit is standby logical unit; and a memory segment on a main memory device capable of being accessed from both the main logical unit and from the standby logical unit is provided; and an information storage space is installed on the memory segment; the spaces are maintained and controlled, and operating status of the main logical unit is monitored and, when an error is detected in monitoring results in the main logical unit, the request for take-over of control is issued according to the state of the error, and instructs the standby logical unit to take over control of all or a portion of the main logical unit processing.

The control method of the present invention is also characterized in that the controller processor is one of a plurality of the processors comprising the shared main memory multiprocessor, or is an external control terminal provided for the shared main memory multiprocessor.

The present invention is further characterized in that when a main memory area controlled by the main logical unit is protected from access by other logical units, the controller processor receives a request from the standby logical unit to access the main memory area controlled by the main logical unit, implements access, and transfers information obtained by the access to the standby logical unit.

The present invention is yet further characterized in that operating status of the main logical unit is monitored, and when an error is detected in results from monitoring the main logical unit, the standby logical unit takes over all of the main logical unit processing when that error causes a problem to occur, and takes over a portion of the main logical unit processing when that error has caused a high load condition to occur.

The present invention is still further characterized in that when the standby logical unit takes over the main logical unit processing, the program code implemented by the standby logical unit is copied by the standby logical unit, from the main memory area controlled by the main logical unit, to the main memory area controlled by the standby logical unit, or the standby logical unit directly uses a program code already present in the main memory controlled by the main logical unit.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein.

DETAILED DESCRIPTION OF THE PREFERRED EMBODIMENTS

The embodiments of the present invention are next described while referring to the accompanying drawings.

Figure 4:
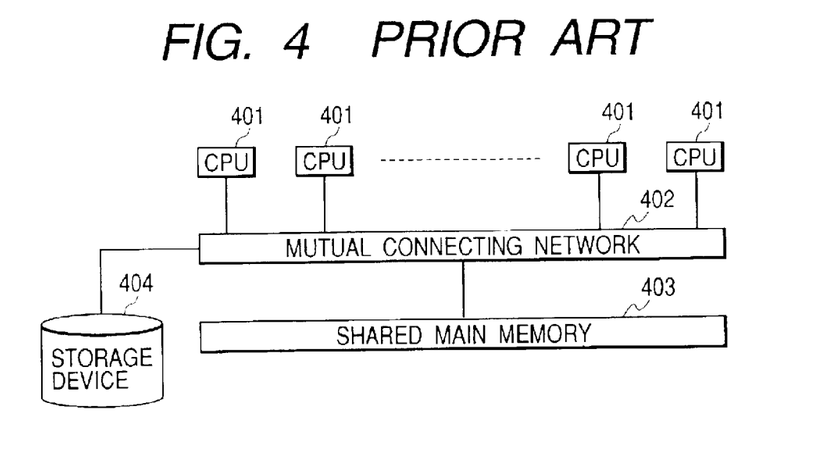
FIG. 4 is a block diagram of the shared main memory multiprocessor system as the platform of the present invention.
Figure 5:
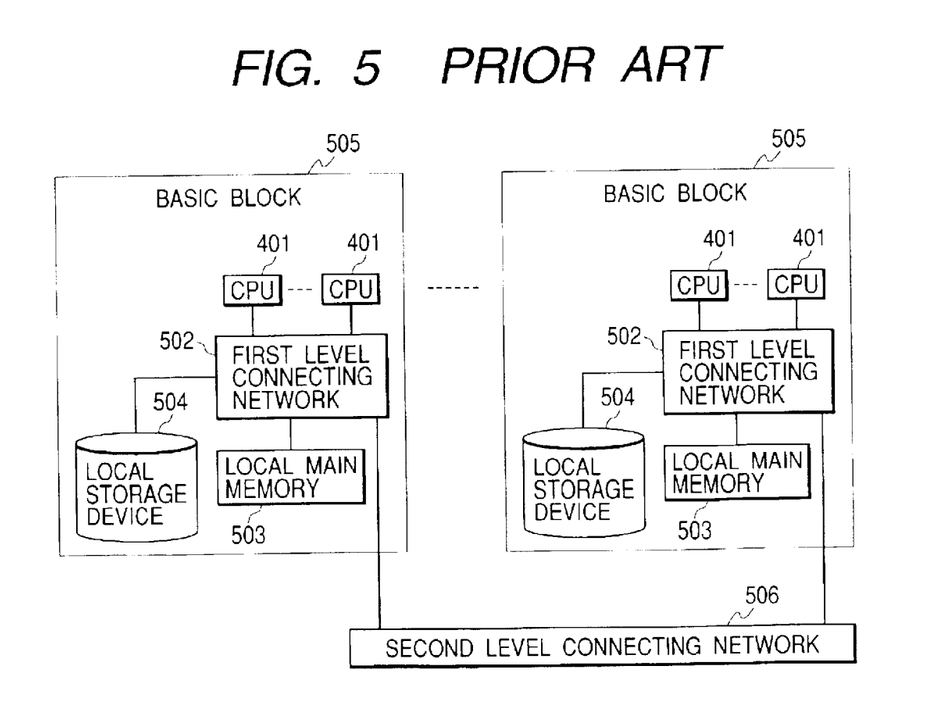
FIG. 5 is a block diagram of the shared main memory multiprocessor system as the platform of the present invention.

FIG. 4 and FIG. 5 are block diagrams of the shared main memory multiprocessor system (as the platform for implementing the server system operation control method of the present invention). The structures in FIG. 4 and FIG. 5 are already disclosed in the known art.

The structure in FIG. 4 is generally called a Symmetric Multiprocessor (SMP) system.

This system mainly comprises multiple CPUs 401, a mutually connecting network 402, a shared main memory 403, and a storage device (external memory device) 404.

The multiple CPUs 401, and the shared main memory 403 and the storage device 404 are mutually connected by the network 402.

Typically, the shared main memory 403 though shown logically as a single structural element in the drawing, is physically comprised of multiple segments and these respective segments are mutually connected to the network 402.

The network 402 may be structured otherwise such as with buses or crossbar switches, etc.

In a system of this kind of structure, the resources constituted by the shared main memory 403 and the storage device 404 can be accessed from any of the CPUs 401.

The structure in FIG. 5 is generally called a Non-Uniform Memory Access (NUMA) system.

This system comprises multiple basic blocks 505 (each is made up of multiple CPUs 401), a first level connecting network 502, a local main memory 503, and a local storage device 504, joined by a second level connecting network 506.

The basic blocks 505 are equivalent to the SMP system shown in FIG. 4. The second level connecting network 506 mutually connects the first level connecting networks 502 in the basic blocks 505.

In a structure of this type, the local main memory 503, and the local storage device 504 can exceed the framework of the basic blocks 505 and be accessed from any CPUs 401 within the system.

For example, when accessing the local main memory 503 or the local storage device 504 inside the basic block 505 on the left side of the figure from one of the CPUs 401 in basic block 505 on the right side of the figure, the applicable local main memory 503 or local storage device 504 can be accessed from the CPU via the first level network 502 within the basic block 505 to which the CPU belongs, and the second level connecting network 506 further via the first level network 502 within the basic block 505 (to which the local main memory 503 or the local storage device 504 constituting the access destination belongs) to access the local main memory 503 or the local storage device 504.

In a system configured this way, if a hierarchical mutual connecting network consisting of multiple first level connecting networks 502 and second level mutual connecting networks 506 is viewed as one logical network such that the structure would be equivalent to the logical structures in FIG. 4 and FIG. 5.

In that respect, a mere physical difference in the structures of FIG. 4 and FIG. 5 would exert no effect in implementing the server system operation control method of the present invention.

The minimum requirement for the platform to definitely satisfy to implement the server system operation control method of the present invention is having the "shared main memory type" of multiprocessor.

One operating configuration for the shared main memory multiprocessor shown in FIG. 4 or in FIG. 5 defines logical operating units called logical partitions that combine portions of an optional number of CPUs 401 and a part of shared main memories 403 (or the local main memory 503 group) within the same system. According to the operating method, each of the logical unit operates independently as a single simulated separate logic system.

Essentially, this method consolidates a total system comprised of multiple physical server systems into one system to reduce the total system operating costs.

The use of a system forming multiple logical units is a precondition for the server system operation control method of the present invention.

Figure 1:
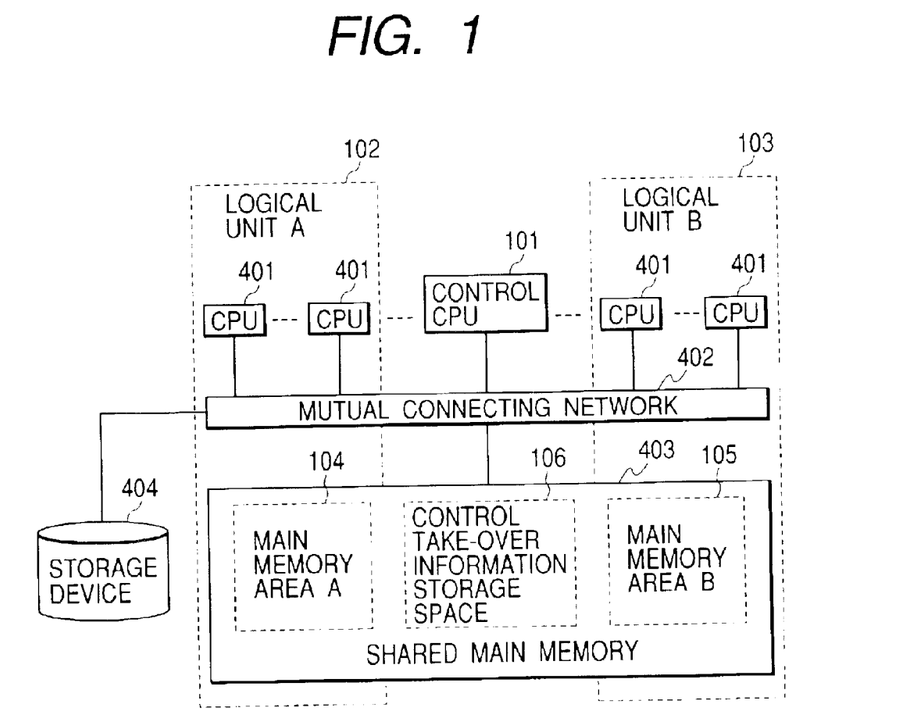
FIG. 1 is a block diagram showing the structure of the shared main memory multiprocessor server system of the present invention.

The server system operation control method of the present invention is next explained in detail referring to FIG. 1.

These multiple logical units are shown by the two logical units: the logical unit A102 and the logical unit B103 conforming to the basic system configuration shown in FIG. 1.

The logical unit A102 and the logical unit B103 each has multiple CPUs 401 and a portion of the shared main memory 403.

A portion of the shared main memory 403 controlled by the logical unit A102 is the main memory area A104. A portion of the shared main memory 403 controlled by the logical unit B103 is the main memory area B105.

This system further has a control take-over information storage space 106 as one area on the shared main memory 403 and a control CPU 101 which is one of the CPUs 401.

The control CPU 101 has the tasks of (1) defining and controlling the logical units, (2) defining the working relation between main and standby systems within the logical unit for performing failover and cloning to improve system reliability and operability, (3) monitoring the operation of the main logical unit, (4) handling the (processing) take-over instructions issued to the standby logical unit, and (5) making/controlling the control take-over information storage space 106.

The control take-over information storage space 106, on the other hand, is a memory area for storing information required for the take-over processing such as failover and cloning. It is part of the shared main memory 403.

Figure 7:
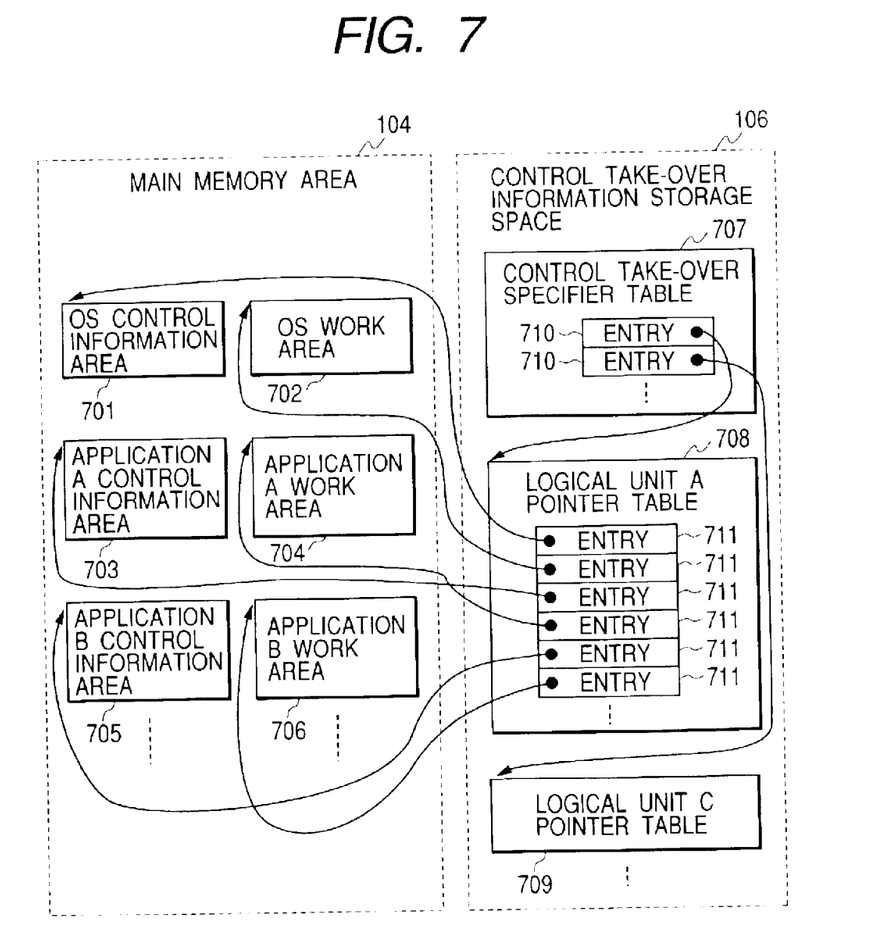
FIG. 7 is a drawing showing the interrelation between the applicable information and information within the control take-over information storage space, and data regions within the main memory area A controlled by the main logical unit A.

A specific example is shown in FIG. 7.

The state of the control take-over information holding space 106 and the main memory area A104 when the logical unit A102 is defined as the main logical unit is shown in FIG. 7.

The control take-over information holding space 106 contains the control take-over specifier table 707 and the pointer tables 708, 709 provided for the main logical unit.

Figure 8:
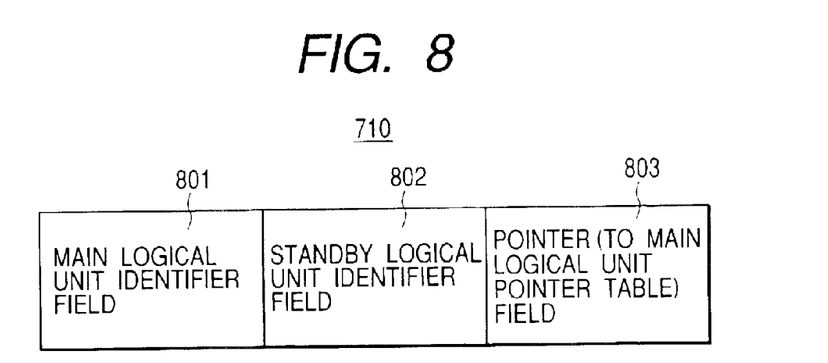
FIG. 8 shows the control take-over table entry configuration within the control take-over information holding space of the present invention.

The entries 710 within the take-over specifier table 707 are made up of a main logical unit identifier field 801, a standby logical unit identifier field 802, and a pointer field 803 to a main logical unit pointer table as shown in FIG. 8.

The entries 710 are used by the control CPU 101 each time to define an active-standby relation between the both logical units for failover and cloning performed by the control CPU 101. The identifier for the main logical unit and the standby logical unit are stored (or registered) in the respective fields 801, 802.

The control CPU 101 also obtains an area for the main logical unit pointer table (708 or 709, etc.), and the head address of the applicable pointer table is stored in the field 803 of the entry 710 where the main logical unit identifier and the standby logical unit identifier are stored.

Figure 9:
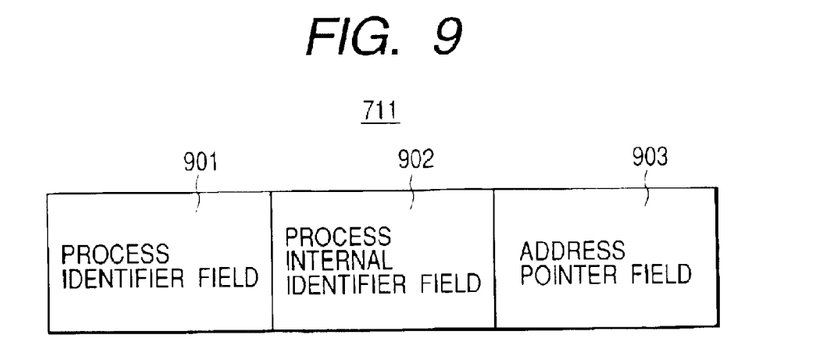
FIG. 9 shows the logical unit pointer table entry configuration within the control take-over information holding space of the present invention.

The entries 711 included in the pointer table 708 for the logical unit A, consist of a process identifier field 901, a process internal identifier field 902, and an address pointer field 903 as shown in FIG. 9.

The entries 711 are basically used by the applicable processes in the relatively early (beginning) stages, i.e., at the startup of the operating system in the main logical unit containing processes requiring reliability and operability.

In those cases, the applicable process identifier (for example, the process ID) is stored (or registered) in the process identifier field 901, the identifiers for distinguishing among multiple data areas for defining the applicable process's own address space is stored in the process internal identifier field 902, and further, the head address of the applicable data area is stored in the address pointer field 903.

Referring back to FIG. 7, in the status in FIG. 7 of the server system of the present invention, at least both of the logical unit A102 and the logical unit C are designated as the main logical units.

The operating system (OS) in the logical unit A102 has already started up, and at least application A and application B are currently being implemented among applications requiring guaranteed reliability and operability.

The main memory area A104 controlled by the logical unit A102 contains an OS control information area 701 utilized by the operating system (OS), an OS work area 702, a control information area 703 used by application A, a work area 704, a control information area 705 utilized by application B, and a work area 706.

The pointer tables 708 and the pointer table 709 are secured, respectively for the logical unit A and for the logical unit C, in the control take-over information storage space 106. Their locations are stored in the respective entries 710 (in particular, in the main logical unit identifier field 801) of the take-over specifier table 707 (its own identifier for the main system) and they are also stored in the pointer (to main logical unit pointer table) field 803.

The arrow lines coming out from the entries 710 in FIG. 7, show where the value of applicable pointer field 803 is indicating.

The OS control information area 701 utilized by the operating system (OS), the OS work area 702, the control information area 703 used by application A, the work area 704, the control information area 705 utilized by application B, and the work area 706 are located in the main memory area 104. Their locations are stored in entries 711 (in particular, the address pointer field 903) for respective data areas in the logical unit A pointer table 708.

The arrow lines coming out from the entries 711 in FIG. 7, show where the applicable address pointer field 903 value is indicating.

The data areas defined in the main memory area A104 shown in FIG. 7 are provided only as examples.

A more specific example is a database cache in the memory for OS process control tables, transaction control tables for use in processing transactions, heaps or pools for each transaction state, and database applications, etc.

How the failover and cloning methods for improving operability are implemented in the structure of the server system of FIG. 1 is described next referring to the processing flow chart of FIG. 6.

First of all, when the system starts up, the control CPU 101 simultaneously defines the logical units and creates a control take-over information storage space 106 as shown in operation 601 and controls it thereafter.

Among the defined logical units, the main logical unit, the standby logical unit as well as the working interrelation between main system and the standby system are defined to implement the improved operability functions of the present invention.

As part of the control take-over information storage space 106 control operation, the control CPU 101 as previously related, creates the control take-over specifier table 707, and stores (registers) the main logical unit and the standby logical unit interrelation in that entry 710.

Areas for the each pointer table (708 or 709, etc.) on the main logical unit are obtained, and the head address of the applicable pointer table are stored (registered) in the field 803 of the entry 710 which stores the above related main logic unit—standby logical unit interrelation.

After these initializing operations are completed, in this example, the control CPU 101 in operation 602, instructs the logical unit A102 to operate as the main logical unit, and in operation 603 instructs the logical unit B103 to operate as the standby logical unit.

The control CPU 101 in this case, conveys the head address of pointer table 708 to the logical unit A102.

The head address of the pointer table 708 may also be conveyed to logical unit B103 at the operation 603, or may also be conveyed during the take-over process command in operation 609 (described later).

When the logical unit A102 has started operation as the main system and its OS has started up, the head addresses of the data areas referred to as the OS control information area 701 and the OS work area 702 (described using FIG. 7) are respectively stored (registered) as pointer information in operation 604 in the address pointer field 903 of the entry 711 of the pointer table 708 within the control take-over information storage space 106.

At that time, the process identifier information and the process internal identifier information are also respectively and simultaneously entered into the applicable process identifier field 901 and the process internal identifier field 902 of the entries 711.

Each time when an application demanding guaranteed reliability and operability, the head addresses of data areas referred to as the control information area and the work area used by the applications, are input in the operation 604 along with startup of the OS, as pointer information in the respective address pointer fields 903 of the entry 711 of the pointer table 708 within the control take-over information storage space 106.

At that time, the process identifier information and the process internal identifier information are also respectively and simultaneously entered into the applicable process identifier field 901 and the process internal identifier field 902 of the entries 711.

This operation 604 is not only implemented during the startup of OS and applications, but may be implemented at any time when acquiring new data areas and when using already existing data areas.

Operation 605 is not a special operation, and can be used at any time as an ordinary program operation for programming (writing) the status or process information into the main memory area A104.

Simultaneous with operation of logical unit A102, the control CPU 101 checks the operating status of the logical unit A102 at a specified timing, as shown in operation 606.

If the logical unit A102 is operating correctly then a normal reply is sent back to the control CPU 101 in response to the operating status check made by the control CPU 101.

However, when an operating status check is made in the time period from an error generation point 607 onwards, is triggered operation 608 onwards.

First of all, in operation 608, an error response is detected by the control CPU 101 in the operation status check made by the control CPU 101.

This error response is sometimes an actual response from the logical unit A102, and sometimes determined by the control CPU101 as a response not coming from the logical unit A102.

In the former case (response coming from A102), the logical unit A102 is at least capable of responding to the operation status check but the level of operability might not be specified to indicate when there were problems or when under an extremely high load. In those cases, the logical unit A102 informs the control CPU 101 that a problem has occurred or that there is an extremely high load.

In the latter case (response not coming from A102), the logical unit A102 is incapable of responding to the operation status checks or gives an exceptionally delayed reply due to the extremely high load.

In those cases, after waiting a specified time for a response, the control CPU 101 decides an error has occurred. In other words, when there is no response within the specified time, it waits further a fixed amount of time for a response. When there is a response within that fixed amount of time, the control CPU 101 decides there is a problem or extremely high load but the level of operability cannot be specified. When there is no response within this fixed amount of time, a problem is determined to have occurred.

After detecting the problem, the CPU 101 searches the control take-over specifier table 707 within the control take-over information storage space 106 and designates the standby logical unit to respond to the main system logical unit A102 where the problem was detected. In this case, the CPU 101 in operation 609, further instructs the logical unit B103 (the standby logical unit), to take over control with the failover method when a problem, such as a crash, has occurred, or to share the workload by the cloning method when an extremely high load has occurred.

The CPU 101 may inform the logical unit B103 at this timing, of the head address of the logical unit A pointer table 708 within the control take-over information storage space 106, as related previously.

After receiving take-over control instructions from the control CPU 101, the logical unit B103 implements the specified control processing according to the request for failover or the request for cloning.

An overview of the applicable operation steps from operation 610 onwards to operation 613 is shown.

This processing starts in operation 610, and pointer values of each type are acquired from the logical unit A pointer table 708, using the head address of logical unit A pointer table 708 within the control take-over information storage space 106, conveyed by the control CPU 101 by operation 611.

In order that the applicable pointer value can show the head address of each type of data area on the main memory area 104 controlled by main logical unit A102, in operation 612, the required processing information and the status required for take-over of control utilizing the applicable pointer values are readout from the applicable data area and copied onto the main memory area 105 controlling the data area.

The processing of operations 611 and 612 is repeated, the processing status of logical unit A102 on main memory area A controlled by the logical unit A102 on the main memory area B105 is restored. The take-over process is completed in operation 613. Hereafter, in the case of failover, operation is taken over from the logical unit A102, and in the case of cloning, a portion of the logical unit A102 load is shared.

The take-over processing using the failover method for restoring logical unit A102 processing in operations 611 and 612 is applicable for all A102 processing. The take-over processing utilizing the cloning method to process the system status relating to the application to be shared from the logical unit A102 as well as the control information and the work area information relating to the applicable application of the OS.

In the logical unit B103 take-over processing operation, the program code implemented by the logical unit B103 can also be copied from the main memory area A104 to the main memory area B105 using the above processing framework. Processing methods that directly search the main memory area A104 (without copying) can also be implemented.

Methods to improve operability by failover and cloning in the server system operation control method of the present invention have been described above.

The description given here is from the viewpoint of taking over information on the main memory however as shown in FIG. 1, however the storage device 404 is basically shared by the logical units in the characteristic structure of the present server system. For example, information on the applicable storage device 404, such as a large-scale data base, can be taken over without processing such as copying so that a detailed description is omitted.

In the previously discussed operation method for forming and operating logical partitions, access to the main memory area controlled by a different logical partition may be prohibited so the operation 612 for referring (searching) the main memory area A104 from the logical unit B103 is impossible in some cases.

In this case, a method can be used in which the control CPU 101 alone is not subject to the above access restrictions, and the logical unit B103 makes a request to the control CPU 101 in operation 612 for a main memory search, and after the control CPU 101 has accessed the applicable main memory, the results are conveyed to the logical unit B103.

A method disclosed in Japanese Patent Publication 235558/2001 defines a shared memory area allowing mutual searches among logical partitions, such that the operation 612 can be implemented on logical unit B103.

In other embodiments of the present invention, the following variations may be used to fulfill other functions of the controller CPU 101.

First of all, to implement control in single process, the control processor itself need not be a single fixed CPU 401, and may consist of special logical partitions.

In this case, the control process may be implemented on any CPU within the applicable logical partitions.

System control may also be implemented from an external console terminal capable.

Figure 6:
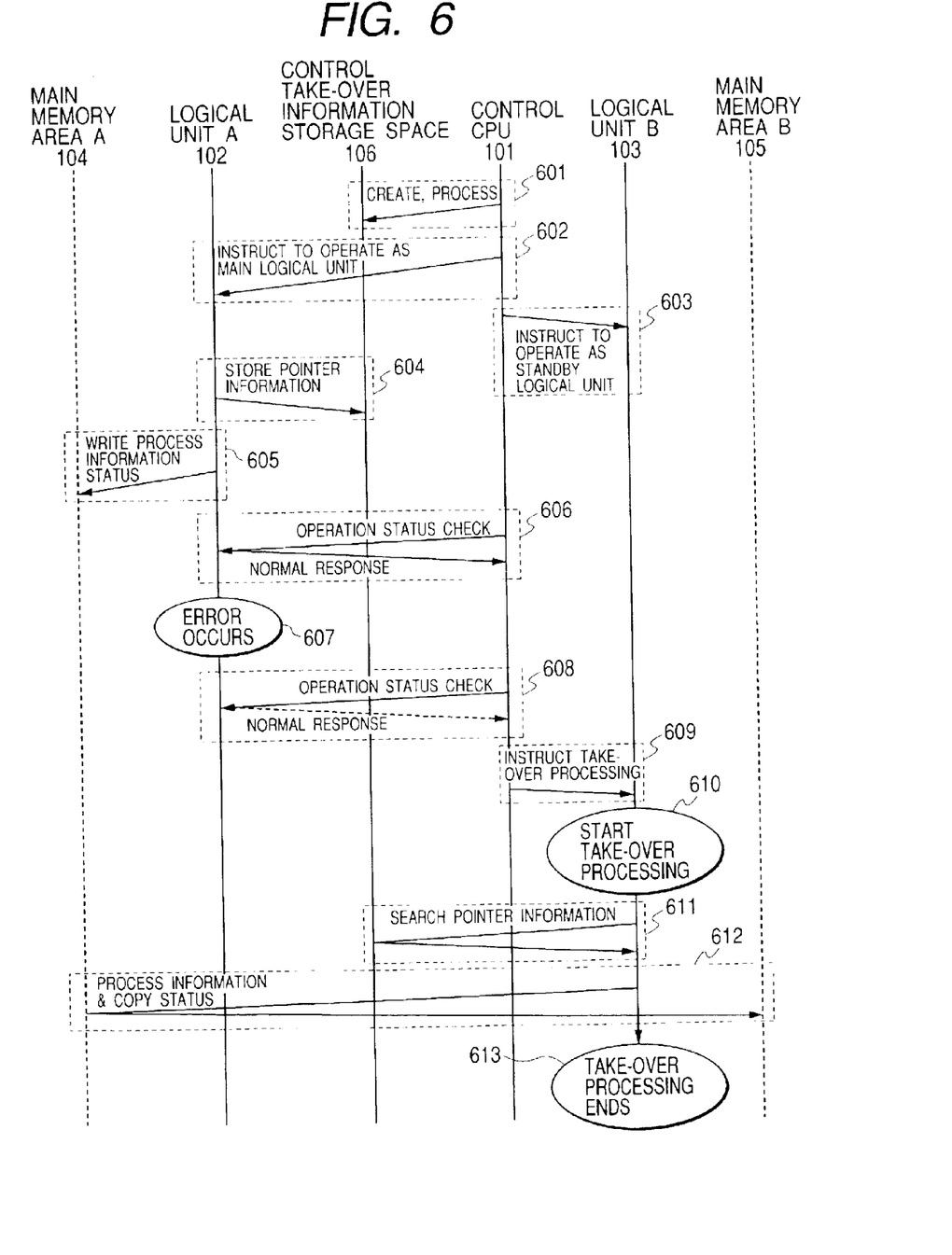
FIG. 6 shows the take-over processing chart implemented by the standby system when a problem occurs in the main logical unit of the present invention.

Another method is to use a processor of a standby logical unit for operations 606, 608, and 609 in FIG. 6.

In the present invention, when an error occurs in the main system processing, the standby system is capable of high-speed searches of a shared memory, rendering the effect that main system processing can be restored at high-speed by a standby system.

A further effect of the present invention is that a server system of high operability can therefore be constructed that shortens or minimizes response times and access problems.

Besides the process status information itself, the beginning address of each data area holding the applicable process status can be stored in advance such that when an error occurs, the latest information can be searched based on the applicable address information, and the processing taken over thereby reducing overhead required for sections other than for process take-over. A server system of high operability can therefore be constructed that shortens or minimizes response times and access problems.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A server system operation control method implemented by a single shared memory type multiprocessor system made up of a plurality of processors, a main memory device, an external memory device and a connection means for mutually connecting these components, comprising the steps of:

designating a main logical unit made up of a group of said processors and a portion of said main memory device and a standby logical unit made up of another group of said processors and another portion of said main memory device, each operating independently;

providing a memory segment on the main memory device to be accessible from both of the main logical unit and the standby logical unit and setting a take-over information storage space on said memory segment to store information for take-over of control from the main logical unit to the standby logical unit;

storing, by the main logical unit, information required for take-over of control to the take-over information storage space at every time when the information is made in said main logical unit; and searching, by the standby logical unit, information stored in the take-over information storage space when a take-over request is sent to the standby logical unit from the main logical unit and forming a processing environment and status in said standby logical unit which are identical to those of the main logical unit, to take over all or a portion of the processing of the main logical unit.

2. A server system operation control method according to claim 1, wherein, when the standby logical unit receives said take-over request from the main logical unit, the standby logical unit searches information stored in the take-over information storage space and, based on the information obtained from the search results, accesses the main memory resources controlled by the main logical unit to form the processing environment and status identical to those of the main logical unit.

3. A server system operation control method according to claim 1, wherein said information for take-over of control includes main memory addresses of main memory areas where information of processing environment and status is stored, and said main memory addresses are updated by said main logical unit when said main memory areas are generated or moved in said main memory device.

4. A server system operation control method according to any of claim 3, wherein said standby logical unit obtains said information of processing environment and status by referring said main memory device using said main memory addresses.

5. A server system operation control method according to claim 1, wherein a control processor designates said main logical unit and standby logical unit, and said take-over request is issued by said control processor.

6. A server system operation control method according to claim 5, wherein said control processor is one of said plurality of processors.

7. A server system operation control method according to claim 5, wherein said control processor is an external control terminal provided for the shared main memory type multi-processor system.

8. A server system operation control method according to any of claim 5, wherein, when a main memory area controlled by the main logical unit is protected from access by other logical units, the control processor receives a request from the standby logical unit to access the main memory area controlled by the main logical unit, executes access, and transfers information obtained by the access to the standby logical unit.

9. A server system operation control method implemented by a shared memory type multiprocessor system including plural processors, a main memory device and connection means for mutually connecting therein, comprising:

designating a main logical unit, a standby logical unit, and a shared memory accessible from both the main logical unit and the standby logical unit;

updating periodically a main logical unit status;

monitoring periodically the updated main logical unit status to check whether a failure occurs in the main logical unit;

storing periodically the updated main logical unit status in a memory of the main logical unit; and once the failure occurs in the main logical unit, instructing the standby logical unit, to take over the main logical unit by retrieving the updated main logical unit status from the memory of the main logical unit so as to restore the updated main logical unit status in the standby logical unit, or to share a workload of the main logical unit by retrieving the updated main logical unit status from the memory of the main logical unit so as to duplicate the updated main logical unit status in the standby logical unit.

10. The server system operation control method according to claim 9, wherein the monitoring step involves determining the failure is a crash or an overload.

11. The server system operation control method according to claim 10, wherein the instructing step involves instructing the standby logical unit to take over the main logical unit if the failure is determined as a crash or to share the workload of the main logical unit if the failure is determined as an overload.

* * * * *